US007817571B2

(12) United States Patent
Claise et al.

(10) Patent No.: US 7,817,571 B2
(45) Date of Patent: Oct. 19, 2010

(54) AUTOMATIC DISCOVERY OF BLOCKING ACCESS-LIST ID AND MATCH STATEMENTS IN A NETWORK

(75) Inventors: Benoit Claise, Crisnèe (BE); Emmanuel Tychon, Fexhe-le-Haut-Clocher (BE)

(73) Assignee: Cisco Technology, Inc., San Jose, CA (US)

( * ) Notice: Subject to any disclaimer, the term of this patent is extended or adjusted under 35 U.S.C. 154(b) by 380 days.

(21) Appl. No.: 11/706,087

(22) Filed: Feb. 14, 2007

(65) Prior Publication Data

US 2008/0192641 A1 Aug. 14, 2008

(51) Int. Cl.
*G06F 11/00* (2006.01)
*H04J 1/16* (2006.01)
*H04L 1/00* (2006.01)

(52) U.S. Cl. ........................................ 370/252; 370/254
(58) Field of Classification Search ................ 370/252, 370/253, 254, 230–233; 709/238, 203, 223–224, 709/240, 229
See application file for complete search history.

(56) References Cited

U.S. PATENT DOCUMENTS

| | | | | |
|---|---|---|---|---|
| 5,935,268 A | * | 8/1999 | Weaver | 714/758 |
| 6,651,096 B1 | * | 11/2003 | Gai et al. | 709/223 |
| 6,662,223 B1 | * | 12/2003 | Zhang et al. | 709/224 |
| 7,304,996 B1 | * | 12/2007 | Swenson et al. | 370/394 |
| 7,346,706 B2 | * | 3/2008 | Rezaaifar et al. | 709/239 |
| 2003/0231631 A1 | | 12/2003 | Pullela | |
| 2005/0021752 A1 | * | 1/2005 | Marimuthu et al. | 709/225 |
| 2006/0174107 A1 | | 8/2006 | Furlong et al. | |
| 2006/0294297 A1 | | 12/2006 | Gupta | |
| 2007/0055789 A1 | * | 3/2007 | Claise et al. | 709/234 |

OTHER PUBLICATIONS

Adel El-Atawy, el al., "An Automated Framework for Validating Firewall Policy Enforcement", Eighth IEEE International Workshop on Policies for Distributed Systems and Networks, 10 pages, 2007.
J. Dunn, et al., Methodology for Forwarding Information Base (FIB) based Router Performance, Benchmarking Working Group, SI International, 14 pages, Feb. 2005.
Vic Grout, et al., "An argument for simple embedded ACL optimisation", Centre for Applied Internet Research (CAIR), University of Wales, UK, 8 pages, Sep. 2006.
Jeff Sedayao, et al., "O'Reilly On-Line Catalog", Cisco IOS Access Lists, Chapter 5 pp. 1-22, Jun. 2001.

\* cited by examiner

*Primary Examiner*—Ayaz R Sheikh
*Assistant Examiner*—Chuong T Ho
(74) *Attorney, Agent, or Firm*—Trellis IP Law Group, PC

(57) ABSTRACT

In one embodiment, a method can include: (i) receiving an incoming probe packet in a network device; (ii) de-encapsulating the incoming probe packet to provide a packet content portion and a drop result portion; (iii) testing the packet content portion against a local access control list (ACL) to determine a local drop result; and (iv) inserting the local drop result and encapsulating an outgoing probe packet.

21 Claims, 5 Drawing Sheets

AUTOMATIC DISCOVERY OF BLOCKING ACCESS-LIST ID AND MATCH STATEMENTS IN A NETWORK

TECHNICAL FIELD

The present disclosure relates generally to automatic discovery of blocking access control list (ACL) identification and match statements in a network.

BACKGROUND

In a conventional network, when packets are dropped somewhere in the network due to an access list denial, it may be difficult to discover a particular router blocking the packets. In addition, it may be difficult to determine an access control list (ACL) number and/or a match statement in the ACL that blocked the packets. Accordingly, ACL management can become a relatively costly task for system administrators.

Conventional options for handling packets that are dropped in a network can include: (i) a remote ping to confirm whether the packets are blocked or not; (ii) a telnet in the source router, and use of ping/trace route utilities to return an intermediate router blocking the packet, but not the ACL identification and the match statement; (iii) an Internet protocol (IP) service level agreement (SLA) operation (e.g., user datagram protocol (UDP)) that may return the router blocking the packets, but not the ACL identification or the match statement; and (iv) use of an ACL management information base (MIB), which may not return an exact match statement unless ACL logic can be built into the network management system (NMS).

DESCRIPTION OF EXAMPLE EMBODIMENTS

Overview

In one embodiment, a method can include: (i) receiving an incoming probe packet in a network device; (ii) de-encapsulating the incoming probe packet to provide a packet content portion and a drop result portion; (iii) testing the packet content portion against a local access control list (ACL) to determine a local drop result; and (iv) inserting the local drop result and encapsulating an outgoing probe packet.

In one embodiment, an apparatus can include: (i) a packet modifier for receiving an incoming probe packet, and for deriving a packet content portion and a drop result portion from the incoming probe packet; (ii) an access control list (ACL) tester for receiving the packet content portion from the packet modifier, and for determining whether an ACL drop condition exists; and (iii) a result updater for receiving an output from the ACL tester, and the drop result portion from the packet modifier, and for providing an outgoing probe packet.

Example Embodiments

Figure 1:
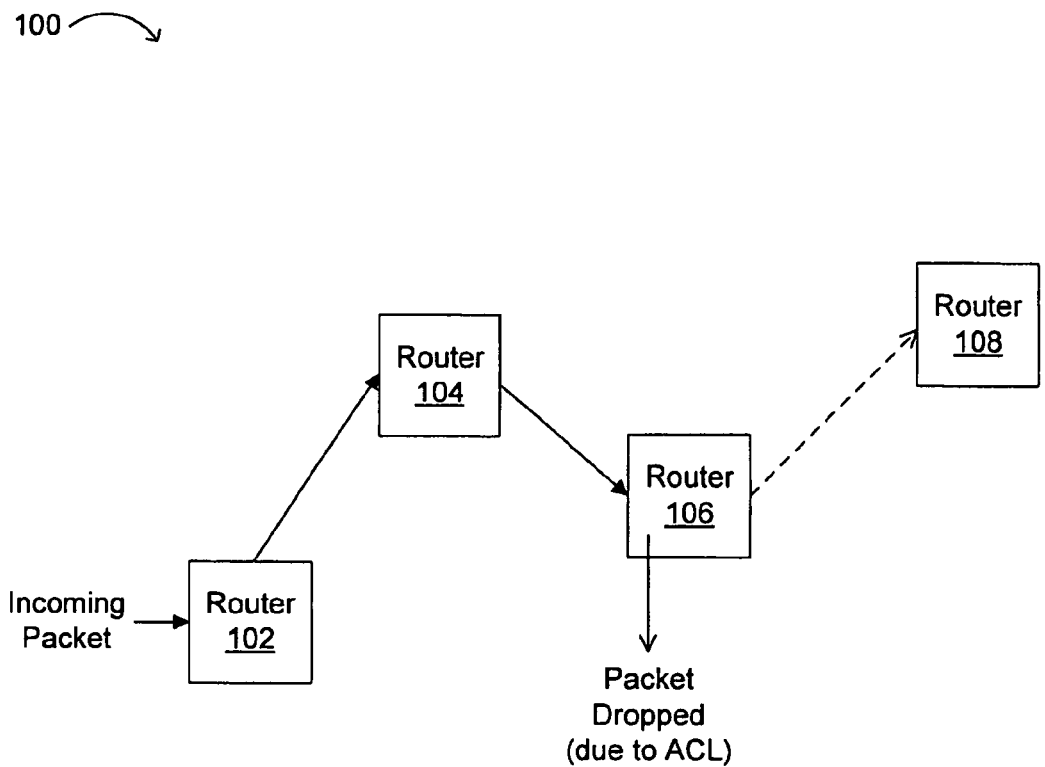
FIG. 1 illustrates an example of a dropped packet traversal in a network.

Referring now to FIG. 1, an example of a dropped packet traversal in a network is shown and indicated by the general reference character 100. An incoming packet can be received at router 102, and passed on to router 104. Router 104 can then pass the packet on to router 106, for an intended destination of router 108. However, because of an access control list (ACL) blocking, the packet may be dropped at router 106, and may not reach router 108. Further, the sender of the incoming packet may not know or be able to readily determine that the packet was in fact dropped, and/or why the packet was dropped, by router 106.

In particular embodiments, a network can be tested using a packet of interest (i.e., a probe or discovery packet) to discover a router that may be blocking the packets, as well as ACL identification (ID) and an exact match statement causing the blocking. In addition, particular embodiments can also be utilized for ACL discovery in equal cost multiple path (ECMP) networks, effectively testing an ACL for many or all ECMPs in a network. This approach is in contrast to conventional approaches, where load balancing per destination may be applied, thus a ping or trace route can take only one path among all ECMPs.

Figure 2:
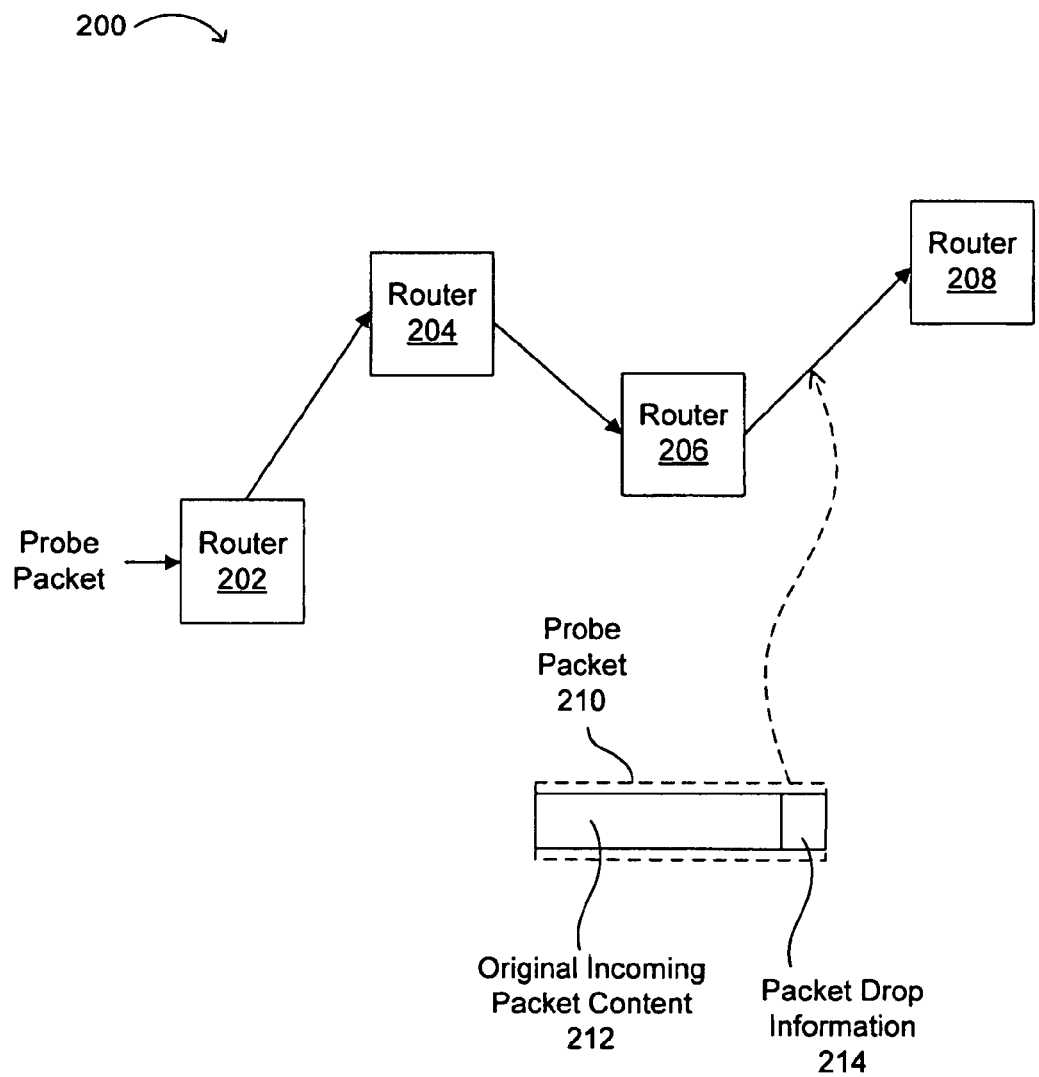
FIG. 2 illustrates an example of a probe packet path in a network.

Referring now to FIG. 2, an example of a probe packet path in a network is shown and indicated by the general reference character 200. A test or probe packet can be received by router 202, and then passed along to router 204, router 206, and to destination router 208 in this particular example. Probe packet 210 can include original incoming packet content 212, as well as packet drop or drop result information 214. Using probe packet 210, a determination can be made of which router (e.g., router 206) may be responsible for dropping or blocking an original packet.

In particular embodiments, many or all routers in a network may be configured to run an agent for ACL discovery. Code in an Internet operating system (IOS) can allow for testing access lists with a specific packet (e.g., a probe packet). Further, the application programming interface (API) can determine if a packet matches a local ACL, but the API may not be able to determine which particular statement in that ACL was blocking.

A responder may be an agent in a router or other network device that can also be responsible for other tasks. For example, this functionality can be inserted into an IP service level agreement (SLA) responder, which may be responsible for performing active measurements across network elements. In particular embodiments, such a responder may be present on many or all routers in a network.

Given a source and a destination, an IP header for that particular packet can be generated. Alternatively, headers of an application of interest can be copied. Such headers may encapsulate into a user datagram protocol (UDP) packet (e.g., a probe packet) for discovery, which can be sent to a responder at each hop in the path, for an evaluation against locally defined ACLs.

Figure 3:
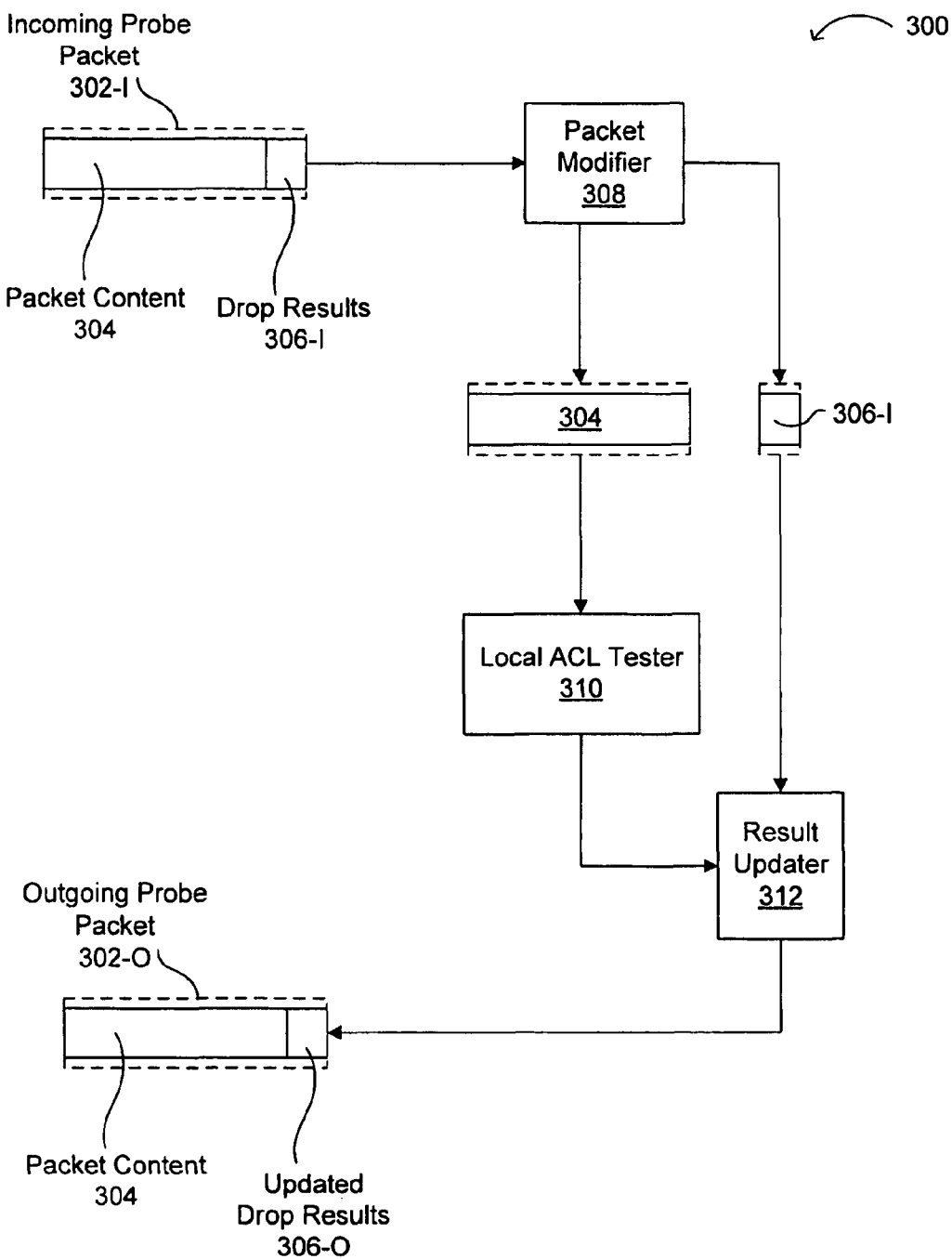
FIG. 3 illustrates an example of probe packet processing within a network device.

Referring now to FIG. 3, an example of probe packet processing within a network device is shown and indicated by the general reference character 300. Incoming probe packet 302-I can include packet content portion 304, and drop result portion 306-I. For example, packet content portion 304 may represent a portion of a packet, such as a packet header, and may not include a full packet. However, some embodiments may use the full packet, or some other packet portion, as packet content portion 304. Incoming probe packet 302-I can be received in packet modifier 308. The packet modifier can essentially separate out a packet content portion (e.g., 304), and a drop result portion (e.g., 306-I).

The packet content portion can be received by a local ACL tester block 310. The local ACL tester can determine whether a local ACL would block the packet content portion. Result updater 312 can receive an output from local ACL tester 310, as well as drop result portion 306-I. The result updater can then re-encapsulate an outgoing probe packet 302-O, which can include the original packet content 304, as well as an updated drop result portion 306-O. If there is no local ACL affecting packet content 304, drop result portions 306-I and 306-O may essentially be the same. In addition, result updater 312 can provide authentication and/or encryption to outgoing probe packet 302-O.

In particular embodiments, a packet of interest may be sent from a source to a destination, hop by hop, as encapsulated in a control header using UDP. A responder (e.g., similar to an IP SLA responder) may be presented on each router in the path. The responder can be configured to: (i) receive this packet; (ii) remove the external encapsulation; (iii) test against the local ACL; and (iv) insert the results in the packet payload.

Figure 4:
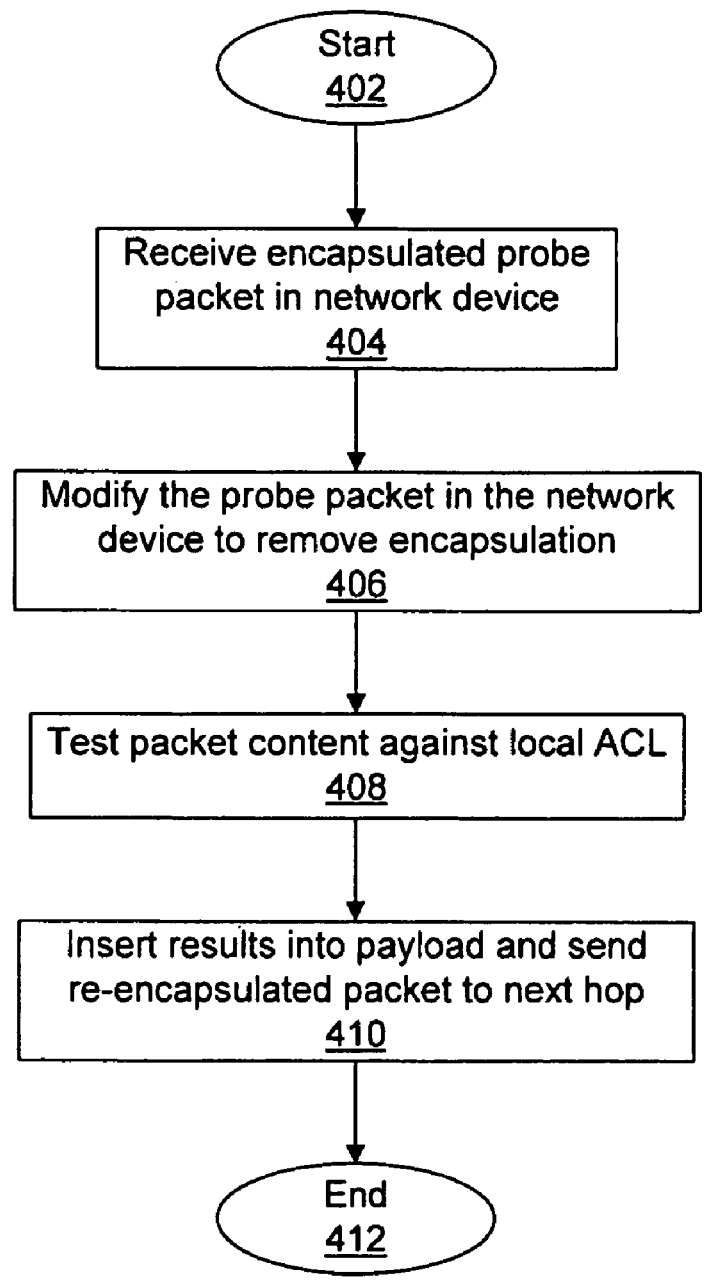
FIG. 4 illustrates an example general flow for probe packet processing within a network device.

Referring now to FIG. 4, an example general flow for probe packet processing within a network device (e.g., including a responder) is shown and indicated by the general reference character 400. The flow can begin (402), and an encapsulated probe packet can be received in a network device (404). The probe packet can then be modified to remove the external encapsulation (406). Next, the packet content can be tested against a local ACL (408). Then, results can be inserted into a payload, re-encapsulation of the packet can occur, and the outgoing packet can be sent to a next hop (410), completing the flow (412).

Figure 5:
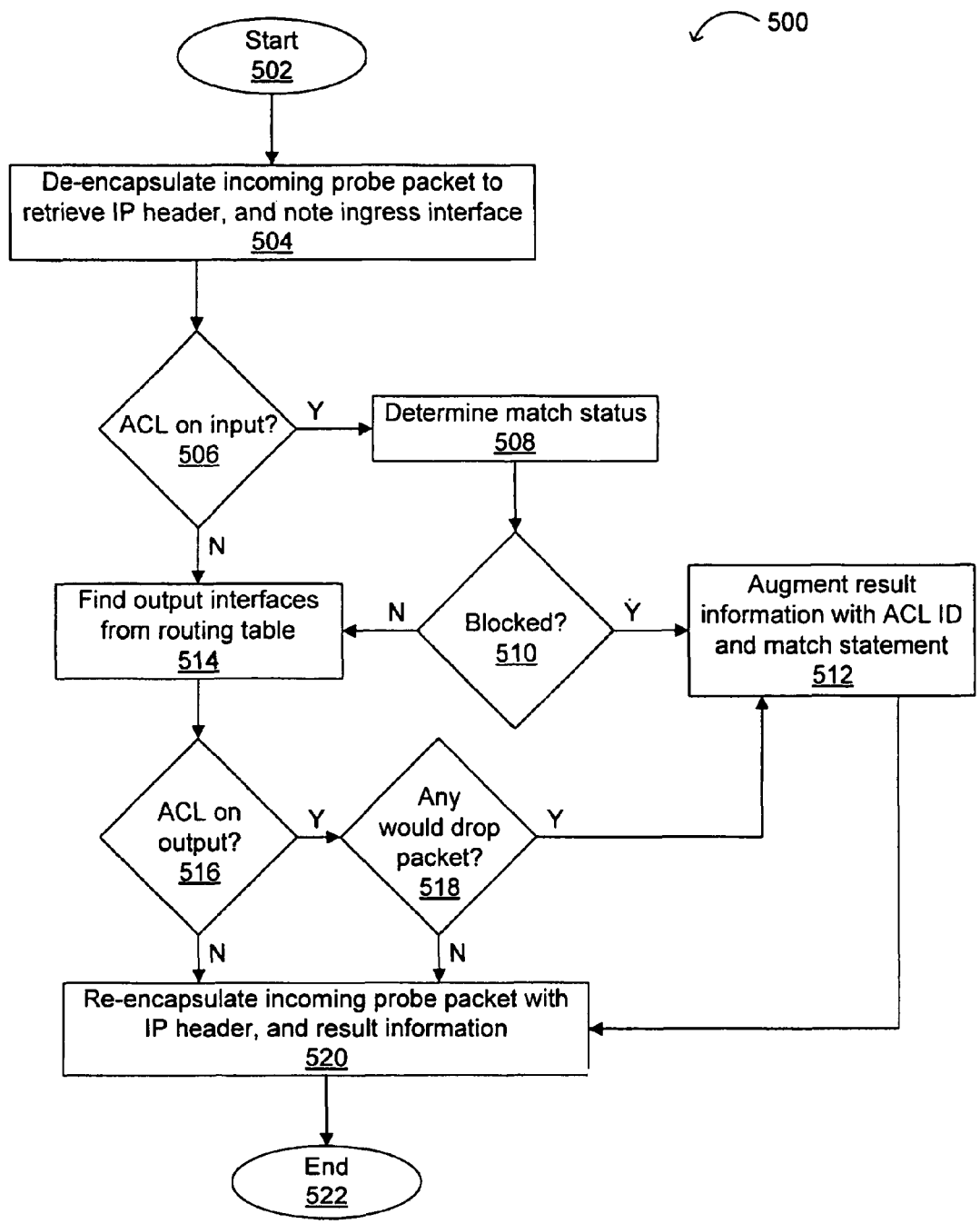
FIG. 5 illustrates an example detailed flow for probe packet processing within a network device.

Referring now to FIG. 5, an example detailed flow for probe packet processing within a network device is shown and indicated by the general reference character 500. In particular embodiments, a responder at each intermediate router can perform the following tasks. The flow can begin (502), and an incoming probe packet or ACL discovery packet can be de-encapsulated to retrieve IP header information, and the ingress interface can be obtained (504).

If the ingress interface includes an input ACL (506), the header can be evaluated to determine if passing or not (i.e., determine the "match status") (508). If the packet is blocked by an ACL (510), the ACL ID and associated match statement can be noted for augmentation of result information (512). Then, the flow can proceed to re-encapsulate the incoming probe packet with IP header and result information (520), and the flow can complete (522).

If there is no ACL on the input (506), or there is an ACL on the input but there is no input blocking (510), any output interfaces can be found by looking at a routing table of the network device (514). For example, there might be more than one output interface in ECMP networks, and there might be different ACLs applied to each such interface. On the other hand, if the destination is local (e.g., in the current network device), then the destination has been reached, and the probe packet can be sent back to the sender with appropriate payload information, for example.

If the network device includes egress interfaces with an output ACL (516), the header can be evaluated to determine if any would drop the packet (518). If one or more such ACL may drop the packet (518), result information can be augmented with the ACL ID and the match statement (512). Then, the flow can proceed to re-encapsulate the incoming probe packet with an IP header and result information (520), and the flow can complete (522). Further, in this fashion all ACLs of each interface of ECMP networks can be evaluated (e.g., by using an iterative procedure).

In augmenting the results (512), the discovery or probe packet payload can be augmented with information gathered in previous steps, such as the ACL ID and the exact match statement. Also included can be the IP address of the ingress interface of this particular router, for later identification of the router. Then, this information can be sent directly to the sender (e.g., source router) for further analysis, or the probe packet can be forwarded along its intended path.

If no blocking ACL was found on the current router or network device, the packet can be encapsulated again in user datagram protocol (UDP), and the probe packet can be sent to a next hop responder. For multiple ECMP networks, duplicate packets can be sent to the next hop of each ECMP in the network, for example.

In particular embodiments, the algorithm can be optimized to return to the sender the router, ACL ID, and the match statement as soon as one blocking ACL is discovered. Accordingly, iterative testing may be performed after an ACL correction in order to discover multiple ACLs, or multiple match statements blocking the packets of interest. Alternatively, particular embodiments may be optimized to report all ACLs and all match statements in one pass. In such embodiments, result information can be forwarded to an intended destination router, for subsequent returning to the source router or sender.

Also, time-based access lists can be treated according to a time at which an ACL discovery may be executed, and therefore can also be supported in particular embodiments. Further, access lists for purposes other than access control (e.g., for traffic shaping, rate limiting, policy routing) may also be taken into account. In particular embodiments, blocking access lists that may jeopardize network access, as opposed to QoS mis-configuration, can also be evaluated.

Particular embodiments can also apply to various other levels, from media access control (MAC) address matching, universal resource locator (URL) matching (e.g., network-based application recognition (NBAR)), or to any payload matching. Particular embodiments may not be limited to only layer 3 because a packet header plus some subsequent bytes of the payload may transfer to each hop in a path, so all current and future ACL types can be checked.

In particular embodiments, a network can be tested with a packet of interest (e.g., a probe packet) to discover a router blocking the packets, an ACL ID, and an exact match statement. Packet headers may be sent to each responder along the path, and adapted for use in a specific protocol, such as the IP SLA protocol, for example.

Particular embodiments can include a testing of ACLs throughout paths taken by a packet of interest. Also, all access list types can be taken into account, as exact packet headers plus some subsequent bytes of a payload, as appropriate, can be transmitted to each responder along a path. Further, particular embodiments can also support ECMP networks. In addition, probe packets in particular embodiments can be authenticated and/or encrypted to prevent attackers from mapping out ACLs. For example, outgoing probe packets may be encrypted, while both incoming and outgoing probe packets may be authenticated.

Although the description has been described with respect to particular embodiments thereof, these particular embodiments are merely illustrative, and not restrictive. For example, other types of network devices, network arrangements, protocols, and/or packet structures can be utilized in particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain and store the program for use by or in connection with the instruction execution system, apparatus, system, or device. The computer readable medium can be, by way of example only but not by limitation, a semiconductor system, apparatus, system, device, or computer memory.

Particular embodiments can be implemented in the form of control logic in software or hardware or a combination of both. The control logic, when executed by one or more processors, may be operable to perform that what is described in particular embodiments.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method, comprising:
   receiving an incoming probe packet via an ingress interface in a network device;
   de-encapsulating the incoming probe packet to provide a packet content portion and a drop result portion;
   testing the packet content portion against a local access control list (ACL) to determine a local drop result, wherein the local drop result includes an identification of the local ACL and a match statement from the local ACL if the testing indicates that the packet content portion would be blocked by the network device due to the match statement;

updating the drop result portion in response to the testing by augmenting the drop result portion with the local drop result;

determining from a routing table if there are one or more egress interfaces of the network device having corresponding output ACLs, wherein the testing and the updating are repeated for each of the output ACLs such that the testing the packet content portion comprises determining if any of a plurality of output ACLs would drop the packet content portion, and the updating comprises augmenting the drop result portion with an identification of an output ACL and a match statement therein if the output ACL would drop the packet content portion; and encapsulating an outgoing probe packet to include the packet content portion and the updated drop result portion.

2. The method of claim 1, further comprising authenticating the incoming probe packet.

3. The method of claim 1, further comprising encrypting the outgoing probe packet.

4. The method of claim 1, wherein the testing the packet content portion comprises determining if there is an input ACL on an ingress interface of the network device, and wherein the testing and the updating are repeated for the input ACL.

5. The method of claim 1, further comprising testing the packet content portion for one or more ACLs for equal cost multiple path (ECMP) networks.

6. The method of claim 1, further comprising re-testing the packet content portion against the local ACL to determine if multiple match statements would block the packet content portion.

7. The method of claim 1, further comprising sending the encapsulated outgoing probe packet to another network device for testing against another ACL.

8. The method of claim 7, further comprising sending the encapsulated outgoing probe packet to the source router from an intended destination router.

9. The method of claim 1, further comprising returning the encapsulated outgoing probe packet from the network device to a source router.

10. The method of claim 1, wherein each of the incoming and outgoing probe packets are encapsulated using user datagram protocol (UDP).

11. An apparatus, comprising:
a packet modifier configured to receive an incoming probe packet, and to derive a packet content portion and a drop result portion from the incoming probe packet;

an access control list (ACL) tester configured to receive the packet content portion from the packet modifier, and to determine whether an ACL drop condition exists, wherein an output from the ACL tester includes an identification of an ACL and a match statement corresponding to the ACL drop condition indicating that the packet content portion would be blocked due to the match statement; and a result updater configured to receive the output from the ACL tester, and the drop result portion from the packet modifier, and to provide an outgoing probe packet that includes the packet content portion and an update to the drop result portion, the drop result portion being updated by adding the output from the ACL tester when the ACL drop condition exists, wherein the ACL tester and the result updater are further configured to determine from a routing table if there are one or more egress interfaces having corresponding output ACLs, wherein the ACL tester is used for each of the output ACLs to determine if any of a plurality of output ACLs would drop the packet content portion, and the result updater is configured to augment the drop result portion with an identification of an output ACL and a match statement therein if the output ACL would drop the packet content portion.

12. The apparatus of claim 11, wherein the packet modifier is further configured to authenticate the incoming probe packet.

13. The apparatus of claim 11, wherein the packet modifier is configured to de-encapsulate the incoming probe packet.

14. The apparatus of claim 11, wherein the result updater is configured to re-encapsulate the outgoing probe packet.

15. The apparatus of claim 11, wherein the ACL tester is further configured to re-test the packet content portion against the ACL to determine if multiple match statements would block the packet content portion.

16. The apparatus of claim 11, wherein the ACL drop condition comprises an ingress interface block.

17. The apparatus of claim 11, wherein the result updater is configured to provide encryption to the outgoing probe packet.

18. The apparatus of claim 11, wherein the outgoing probe packet is configured to be returned to a source router.

19. The apparatus of claim 11, configured for an equal cost multiple path (ECMP) network.

20. The apparatus of claim 11, wherein each of the incoming probe packet and the outgoing probe packet are encapsulated using user datagram protocol (UDP).

21. A system for discovering a blocking access control list (ACL), the system comprising:
means for receiving an encapsulated probe packet in a network device;

means for de-encapsulating the received packet to provide a packet content portion and a drop result portion;

means for testing the packet content portion against an ACL in the network device to determine a local drop result, wherein the local drop result includes an identification of the local ACL and a match statement from the ACL if the testing indicates that the packet content portion would be blocked by the network device due to the match statement;

means for updating the drop result portion in response to the testing by augmenting the drop result portion with the local drop result;

means for determining from a routing table if there are one or more egress interfaces of the network device having corresponding output ACLs, wherein the testing and the updating are repeated for each of the output ACLs such that the testing the packet content portion comprises determining if any of a plurality of output ACLs would drop the packet content portion, and the updating comprises augmenting the drop result portion with an identification of an output ACL and a match statement therein if the output ACL would drop the packet content portion; and means for re-encapsulating the probe packet to include the packet content portion and the updated drop result portion.

* * * * *